United States Patent
Schnaibel et al.

(10) Patent No.: US 6,886,399 B2
(45) Date of Patent: May 3, 2005

(54) METHOD FOR DETERMINING MASS FLOWS INTO THE INLET MANIFOLD OF AN INTERNAL COMBUSTION ENGINE

(75) Inventors: Eberhard Schnaibel, Hemmingen (DE); Wilfried Tuleweit, Schwieberdingen (DE); Manfred Pfitz, Vaihingen (DE); Roland Herynek, Oetisheim (DE); Holger Bellmann, Ludwigsburg (DE); Gholamabas Esteghlal, Ludwigsburg (DE); Detlef Heinrich, Ludwigsburg (DE); Lutz Reuschenbach, Stuttgart (DE); Georg Mallebrein, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/220,129

(22) PCT Filed: Dec. 22, 2001

(86) PCT No.: PCT/DE01/04025

§ 371 (c)(1),
(2), (4) Date: Sep. 16, 2002

(87) PCT Pub. No.: WO02/053897

PCT Pub. Date: Jul. 11, 2002

(65) Prior Publication Data

US 2003/0177844 A1 Sep. 25, 2003

(51) Int. Cl.[7] .............................................. G01M 15/00
(52) U.S. Cl. ....................................................... 73/118.2
(58) Field of Search ........................... 73/116, 112, 115, 73/117.2, 118.1, 118.2; 340/438, 439; 701/29, 99, 101

(56) References Cited

U.S. PATENT DOCUMENTS

| 5,597,951 | A | * | 1/1997 | Yoshizaki et al. ......... 73/118.2 |
| 5,780,730 | A | * | 7/1998 | Scourtes et al. .......... 73/117.2 |
| 5,889,205 | A | * | 3/1999 | Treinies et al. ........... 73/118.2 |
| 5,974,870 | A | * | 11/1999 | Treinies et al. ........... 73/118.2 |
| 6,016,460 | A | * | 1/2000 | Olin et al. .................. 701/102 |
| 6,561,014 | B1 | * | 5/2003 | Smith et al. ................ 73/117.1 |
| 2003/0075158 | A1 | * | 4/2003 | Milos et al. ........... 123/568.21 |
| 2003/0084712 | A1 | * | 5/2003 | Smith et al. ............... 73/118.1 |
| 2003/0154777 | A1 | * | 8/2003 | Worth et al. .............. 73/118.2 |

FOREIGN PATENT DOCUMENTS

| DE | 36 24 441 | 1/1988 |
| EP | 0952332 | 10/1999 |

* cited by examiner

Primary Examiner—Eric S. McCall
(74) Attorney, Agent, or Firm—Walter Ottesen

(57) ABSTRACT

A method detects mass flows to the intake manifold of an internal combustion engine having a device for controlling the air supply to the intake manifold and having a sensor for detecting the intake manifold pressure and having a control apparatus for evaluating a trace of the intake manifold pressure. In the context of the method, when the internal combustion engine is switched off, the supply of air to the intake manifold is reduced in a predetermined manner and the trace of the intake manifold pressure, which adjusts thereupon, is evaluated for detecting the mass flows.

10 Claims, 3 Drawing Sheets

METHOD FOR DETERMINING MASS FLOWS INTO THE INLET MANIFOLD OF AN INTERNAL COMBUSTION ENGINE

BACKGROUND OF THE INVENTION

Examples of systems which conduct masses to the intake manifold are the tank venting and the exhaust-gas recirculation. Known methods for diagnosing these systems are based on a detection of the mass flows to the intake manifold. U.S. Pat. No. 4,794,790 describe, for example, a diagnostic method for a tank-venting valve wherein an idle actuator is closed simultaneously with the opening of the tank-venting valve. In a good condition, the additional mass flow from the tank-venting system is intended to compensate for the reduction of the mass flow via the idle actuator.

For diagnosing the exhaust-gas recirculation, it is further known to measure the temperature increase in the intake manifold via the exhaust-gas mass flow to the intake manifold for an active exhaust-gas recirculation.

SUMMARY OF THE INVENTION

The object of the invention is the further improvement of the self diagnosis of engine control systems via a detection of mass flows to the intake manifold.

In the following, the detection of mass flows in accordance with the invention to the intake manifold of an internal combustion engine takes place with the following:

means for controlling the air supply to the intake manifold;

means for detecting the intake manifold pressure; and, means for evaluating the intake manifold pressure trace.

When switching off the internal combustion engine, the air supply to the intake manifold is reduced in a targeted manner and the trace of the intake manifold pressure, which results as a consequence thereof, is evaluated for making a judgment.

For example, a targeted closing of the throttle flap takes place when switching off the engine and an evaluation takes place of the resulting pressure trace in the intake manifold.

Stated otherwise, in accordance with the example, the reduction of the air supply takes place via a targeted closure of the throttle flap. flap is closed in a targeted manner to a defined opening angle.

A further embodiment is characterized in that no further system, which supplies to the intake manifold, is activated when the engine is switched off and when there is a targeted closure of the throttle flap.

According to a further embodiment, a conclusion is drawn as to a leakage when the speed of a pressure change exceeds a predetermined threshold value.

A further embodiment of the invention provides that a system, which supplies mass to the intake manifold, is actuated in a targeted manner and a conclusion is drawn as to the mass flow of this system from a comparison of the expected intake manifold pressure trace to the measured intake manifold pressure trace.

The invention is also directed to a control arrangement for carrying out at least one of the above methods and embodiments.

According to a further embodiment of the invention, the system, which supplies mass to the intake system, includes one of the following systems:

the exhaust-gas recirculation;

the tank venting; and, the throttle flap at small throttle flap angles.

If the motor is shut off and the throttle flap is adjusted to a very small angle in a targeted manner and no additional system, which supplies the intake manifold, is activated, then, in each case, a relatively slow pressure increase to the ambient pressure results when no further mass flows flow through the intake manifold except via the throttle flap.

A leakage of the system can be concluded from a higher speed of pressure change.

If required, a system, which supplies mass to the intake manifold (for example, the exhaust-gas recirculation system), can be actuated in a targeted manner. A conclusion can be drawn as to the mass flow of this system from the comparison of the expected intake manifold pressure trace to the measured intake manifold pressure trace.

The invention is also directed to a control apparatus for carrying out the method as well as to further disclosed configurations.

The invention permits a throughflow diagnosis of systems which supply mass to the intake system, for example: the exhaust-gas recirculation; the tank venting; and, the throttle flap at small throttle flap angles and a detection of leakage air inflows to the intake manifold. In experiments, a clear measuring effect was, for example, determined for a diagnosis of the exhaust-gas recirculation system.

It is a special advantage that mass flows can be determined with relatively simple functions. The invention supplies an on-board diagnostic possibility in the context of an already-available system content without additional system complexity (for example, without special additional sensors).

BRIEF DESCRIPTION OF THE DRAWINGS

The invention will now be described with reference the drawings wherein.

DESCRIPTION OF THE PREFERRED EMBODIMENTS OF THE INVENTION

Figure 1:
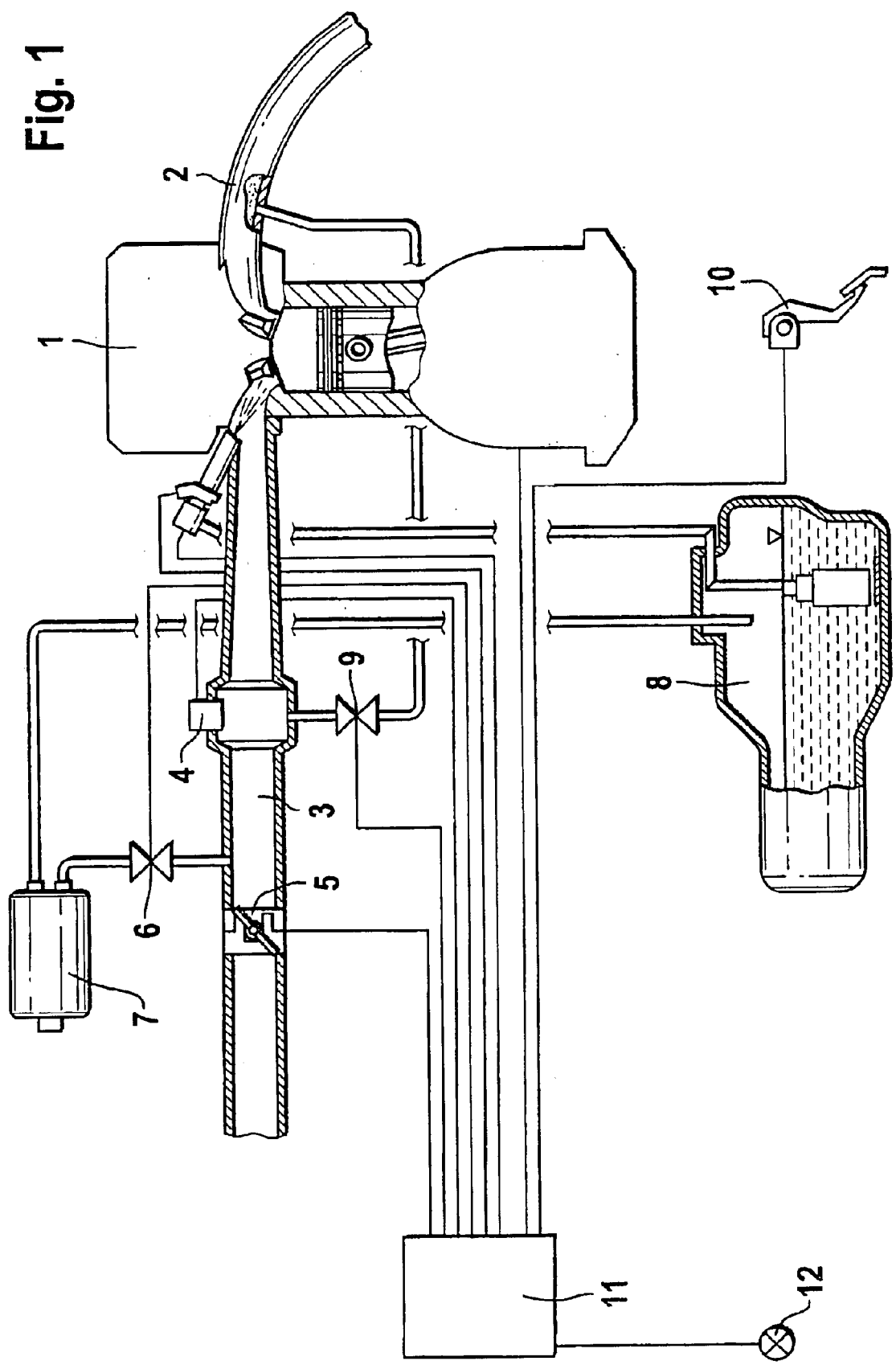
FIG. 1 shows the technical background of the invention.

In FIG. 1, 1 identifies an internal combustion engine, 2 an exhaust-gas pipe, 3 an intake manifold, 4 an intake manifold pressure sensor, 5 an electrically adjustable throttle flap, 6 a tank-venting valve, 7 an active charcoal filter, 8 a fuel tank, 9 an exhaust-gas recirculation valve, 10 an accelerator pedal module and 11 a control apparatus. Numeral 12 identifies a means for displaying and/or storing diagnostic results, for example, a fault lamp or a memory cell for storing a detailed fault code.

An air mass flows to the intake manifold flows via an open throttle flap. Further inflows are possible via the tank-venting valve 6 and/or the exhaust-gas recirculation valve 9 and/or a leak in the intake manifold.

The intake manifold pressure sensor measures the total pressure p-saug of the gas in the intake manifold.

Figure 2:
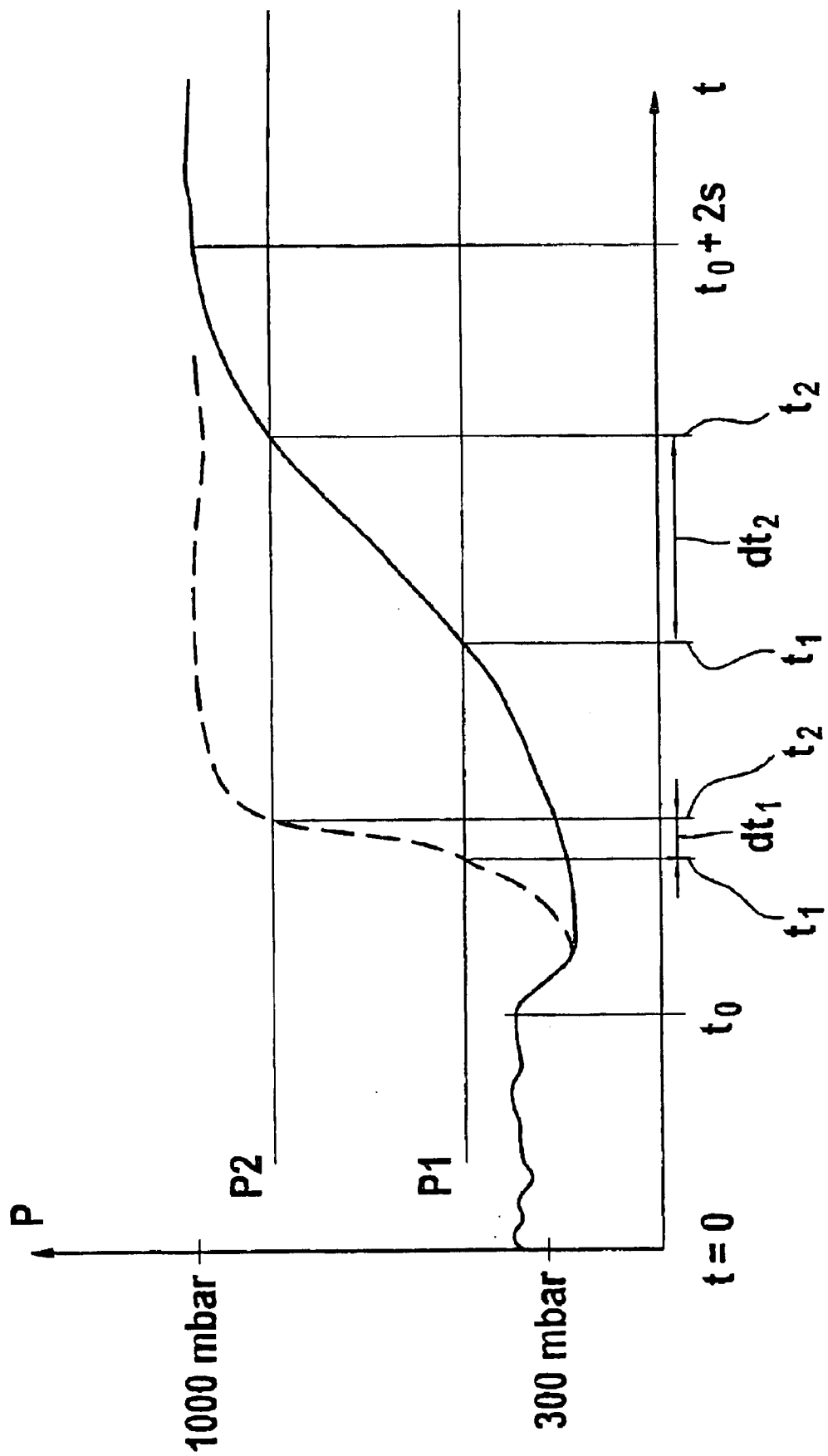
FIG. 2 shows graphs illustrating the intake manifold pressure as a function of time for explaining the invention; and, FIG. 3 is a flowchart showing an embodiment of the method of the invention.

Time-dependent traces of the intake manifold pressure are set forth in FIG. 2.

In the time span between t=0 and t0, the engine runs at idle. Here, an intake manifold pressure of approximately 300 mbar typically settles in. The engine is switched off at time point t0. According to the invention, the throttle flap is closed in a targeted manner. The rpm of the switched-off engine then drops rapidly to zero. Because of the engine rotation still present when switched off, a dropping pressure could still be present for a short time in the intake manifold. In each case, a relatively slow pressure increase takes place up to the value of the ambient pressure when no further mass flows flow into the intake manifold except for the mass flow via the throttle flap. Here, the solid line in FIG. 2 is noted. In this case, the intake manifold pressure first sank below the idle pressure of approximately 300 mbar and then increased in a time span of more than 2 seconds to the ambient pressure (approximately 1000 mbar).

The broken line in FIG. 2 corresponds to a pressure trace as it is to be expected for an open exhaust-gas recirculation valve. In this case, the intake manifold pressure increases considerably faster to the ambient pressure.

Figure 3:
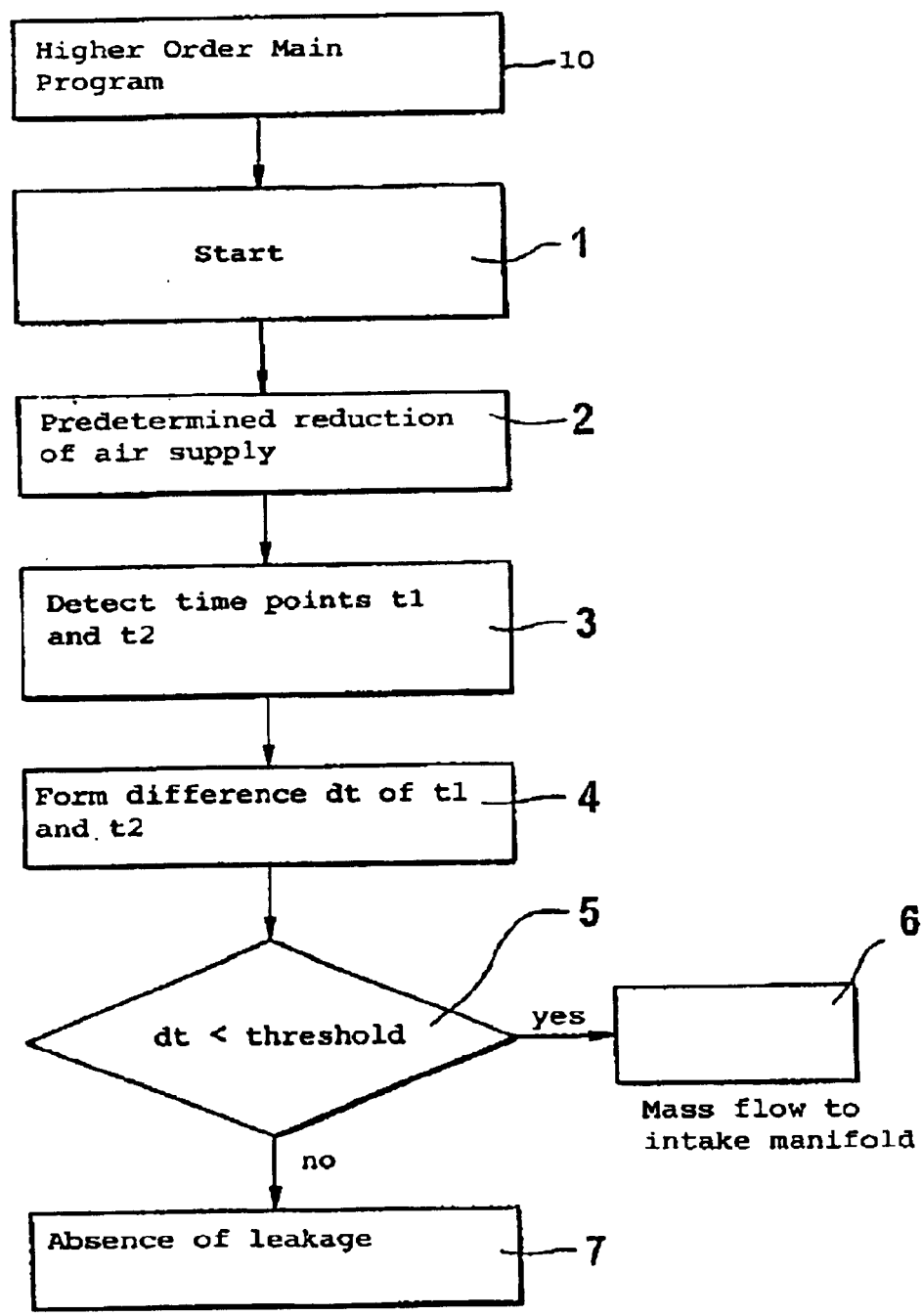

An embodiment of the method of the invention is shown in FIG. 3 wherein block 20 identifies a higher order main program. Step 1 is reached from the higher-order main program 20 for controlling the engine functions when the engine is to be switched off. In this case, a targeted reduction of the air supply takes place via a reduction of the throttle flap opening angle in step 2. Step 3 functions for detecting the time points t1 and t2 at which the increasing intake manifold pressure reaches a first pressure threshold value P1 and a second pressure threshold value P2. The difference dt of both time points, which is formed in step 4, is proportional to the rate of change of the intake manifold pressure. In step 5, a comparison takes place of the difference dt with a pregiven threshold value. If dt is less than the threshold value, this shows a mass flow to the intake manifold. This can be evaluated as an indication for the following: a defectively open exhaust-gas recirculation valve, a defectively open tank-venting valve, a throttle flap which is not closed sufficiently enough or for a leak in the intake manifold (step 6). As a consequence, the fault lamp 12 can, for example, be switched on. If dt is not less than the threshold then this can be evaluated as an indication of the absence of leakage (OK) (step 7).

As a further embodiment, a system can be activated in a targeted manner which supplies mass to the intake manifold. For example, an exhaust-gas recirculation valve or a tank-venting valve can be opened in a targeted manner so that a conclusion can be drawn as to the mass flow of this system from the comparison of the expected intake manifold pressure trace with the measured intake manifold pressure trace.

What is claimed is:

1. In an internal combustion engine having an intake manifold to which air is supplied and wherein an intake manifold pressure develops, a method for detecting mass flows to the intake manifold of the internal combustion engine including: means for controlling the air supplied to the intake manifold; means for detecting the intake manifold pressure; and, means for evaluating the intake manifold pressure; the method comprising the steps of:

when the internal combustion engine is switched off, reducing the supply of air to the intake manifold in a predetermined manner whereupon the intake manifold pressure changes as function of time; and, evaluating a trace of said intake manifold pressure changes as a function of time to detect a mass flow into said intake manifold.

2. The method of claim 1, wherein said internal combustion engine includes a throttle flap and the reduction of the air supply takes place via a predetermined movement of the throttle flap in a closing direction thereof.

3. The method of claim 2, wherein the throttle flap is moved to a defined opening angle in targeted manner.

4. The method of claim 1, wherein, when the engine is switched off and for a closing movement of the throttle flap in a targeted manner, no further system is activated which supplies the intake manifold.

5. In an internal combustion engine having an intake manifold to which air is supplied and wherein an intake manifold pressure develops, a method for detecting mass flows to the intake manifold of the internal combustion engine including: means for controlling the air supplied to the intake manifold; means for detecting the intake manifold pressure; and, means for evaluating the intake manifold pressure; the method comprises the steps of:

when the internal combustion engine is switched off, reducing the supply of air to the intake manifold in a predetermined manner whereupon the intake manifold pressure changes as function of time;

evaluating a trace of said intake manifold pressure changes as a function of time to detect a mass flow into said intake manifold; and, wherein said internal combustion engine further includes a system supplying said intake manifold; and, when a rate of change of pressure exceeds a predetermined threshold value, drawing a conclusion as to leakage of the system.

6. In an internal combustion engine having an intake manifold to which air is supplied and wherein an intake manifold pressure develops, a method for detecting mass flows to the intake manifold of the internal combustion engine including: means for controlling the air supplied to the intake manifold; means for detecting the intake manifold pressure; and, means for evaluating the intake manifold pressure; the method comprising the steps of:

when the internal combustion engine is switched off, reducing the supply of air to the intake manifold in a predetermined manner whereupon the intake manifold pressure changes as function of time;

evaluating a trace of said intake manifold pressure changes as a function of time to detect a mass flow into said intake manifold; and, wherein a system, which supplies a mass flow to the intake manifold, is actuated in a predetermined manner and a conclusion is drawn as to the mass flow of this system from a comparison of said trace with the measured intake manifold pressure.

7. The method of claim 6, wherein the system, which supplies a mass flow to the intake system, includes one of the following systems: an exhaust-gas recirculation; a tank venting; and, a throttle flap at small throttle flap angles.

8. In an internal combustion engine having an intake manifold to which air is supplied and wherein an intake manifold pressure develops, a control unit for carrying out a method for detecting mass flows to the intake manifold of an internal combustion engine including: means for controlling air supplied to the intake manifold; means for detecting the intake manifold pressure; and, means for evaluating the intake manifold pressure; the control unit comprising means for performing the method steps of:

when the internal combustion engine is switched off, reducing the supply of air to the intake manifold in a predetermined manner whereupon the intake manifold pressure changes as function of time; and, evaluating a trace of said intake manifold pressure changes as a function of time to detect a mass flow into said intake manifold.

9. The control unit of claim 8, wherein a conclusion is drawn as to a leakage in said intake manifold or in a system connected thereto when said mass flow causes said trace to depart from a predetermined shape thereof.

10. The method of claim 1, wherein a conclusion is drawn as to a leakage in said intake manifold or in a system connected thereto when said mass flow causes said trace to depart from a predetermined shape thereof.

* * * * *

UNITED STATES PATENT AND TRADEMARK OFFICE
CERTIFICATE OF CORRECTION

PATENT NO. : 6,886,399 B2
DATED : May 3, 2005
INVENTOR(S) : Eberhard Schnaibel et al.

It is certified that error appears in the above-identified patent and that said Letters Patent is hereby corrected as shown below:

<u>Title page,</u>
Item [86], PCT No., delete "PCT/DE01/04025" and substitute -- PCT/DE01/04925 -- therefor.
Insert Item -- [30] Foreign Application Priority Data
28 Dec 00   (DE) ………………………………… 100 65 122 -- therefor.

<u>Column 4,</u>
Line 2, add -- a -- before "targeted".
Line 27, add -- a -- after "to".

Signed and Sealed this

Twelfth Day of July, 2005

JON W. DUDAS
*Director of the United States Patent and Trademark Office*